United States Patent
Yazaki

(10) Patent No.: US 8,096,664 B2
(45) Date of Patent: Jan. 17, 2012

(54) PROJECTOR WITH CASE HAVING BULGED EXTERIOR SURFACE

(75) Inventor: Nobuo Yazaki, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 345 days.

(21) Appl. No.: 12/394,468

(22) Filed: Feb. 27, 2009

(65) Prior Publication Data

US 2009/0225283 A1 Sep. 10, 2009

(30) Foreign Application Priority Data

Mar. 4, 2008 (JP) .................................. 2008-053774

(51) Int. Cl.
*G03B 21/14* (2006.01)
*G03B 21/28* (2006.01)

(52) U.S. Cl. .......................................... 353/119; 353/98

(58) Field of Classification Search .................... 353/69, 353/74, 77, 98, 119; 359/247, 364, 708, 359/857, 858

See application file for complete search history.

(56) References Cited

U.S. PATENT DOCUMENTS

| 3,135,156 A * | 6/1964 | Thevenaz ...................... 352/194 |
| 2005/0207038 A1* | 9/2005 | Inamoto ........................ 359/857 |
| 2008/0218707 A1* | 9/2008 | Adachi et al. ................... 353/98 |

FOREIGN PATENT DOCUMENTS

| CN | 101261360 A | 9/2008 |
| JP | 2004-252049 | 9/2004 |

\* cited by examiner

*Primary Examiner* — Georgia Y Epps
*Assistant Examiner* — Renee Naphas
(74) *Attorney, Agent, or Firm* — Occhiuti Rohlicek & Tsao LLP

(57) ABSTRACT

A projector for emitting projection light in a projection direction used in a floor set-wall projection and floor set-floor projection modes. The device includes an aspheric reflection mirror, which reflects light from a light source in the projection direction, and a case, which accommodates the mirror. The mirror reflects the projection light to emit the projection light through an opening in the case. The case includes a first setting surface, which is arranged adjacent to a floor when in the floor set-wall projection mode, and a second setting surface, which is arranged adjacent to the floor when in the floor set-floor projection mode. The second setting surface in the floor set-floor projection mode is located immediately below the mirror and bulges to a location that is in alignment with or frontward from a front end of the mirror.

13 Claims, 5 Drawing Sheets

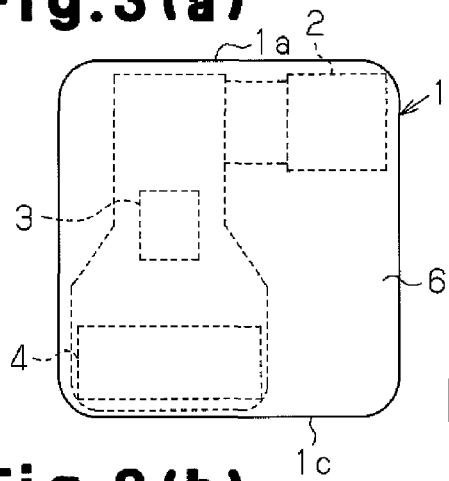
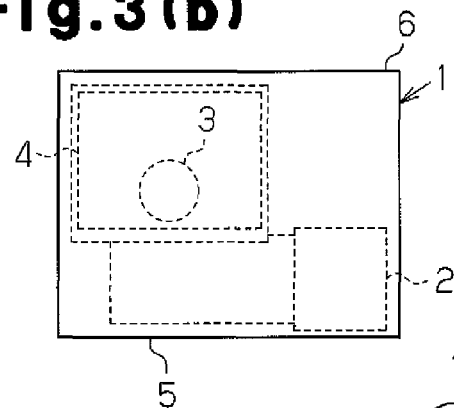
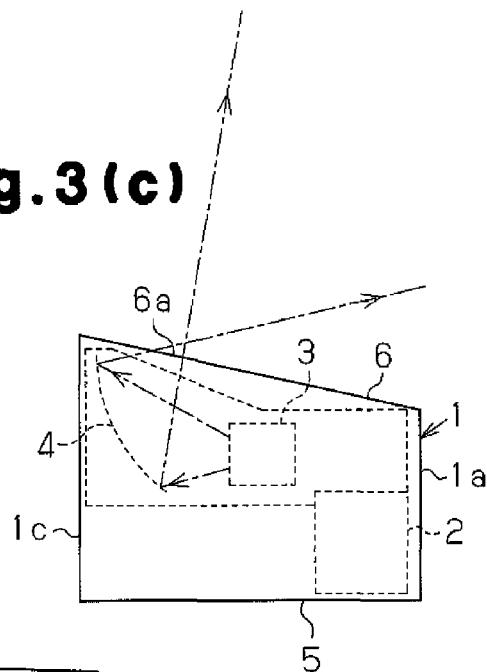
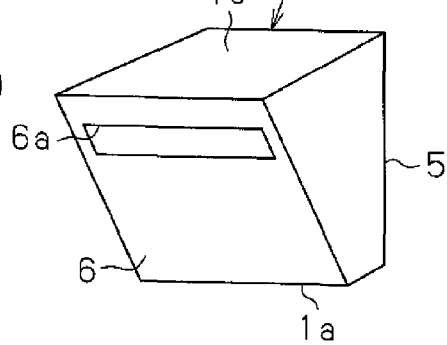
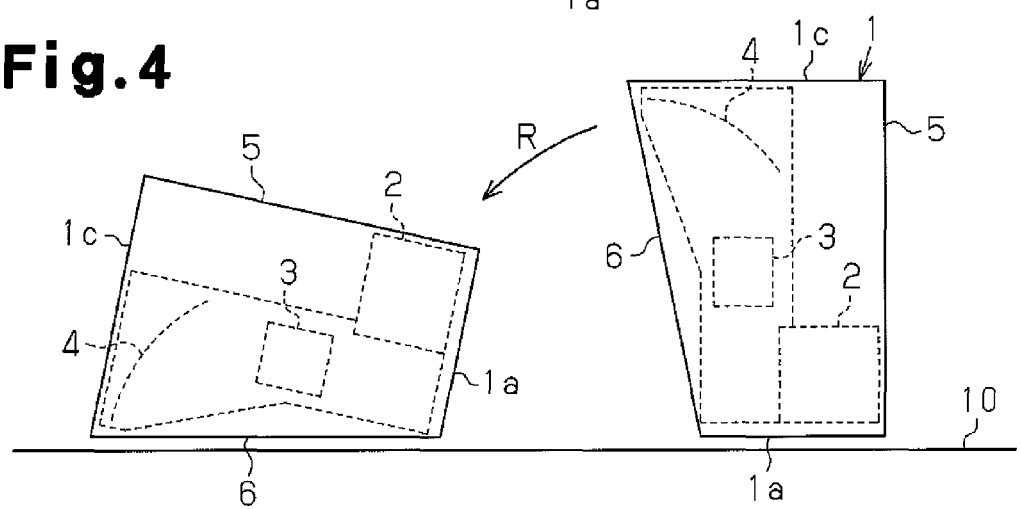

PROJECTOR WITH CASE HAVING BULGED EXTERIOR SURFACE

CROSS-REFERENCE TO RELATED APPLICATIONS

This application is based upon and claims the benefit of priority from prior Japanese Patent Application No. 2008-053774, filed on Mar. 4, 2008, the entire contents of which are incorporated herein by reference.

BACKGROUND OF THE INVENTION

The present invention relates to a projector.

Projectors are used in various types of facilities, such as home theaters, conference rooms, classrooms, training rooms, amusement halls, exhibition halls, and studios, to project graphics generated by a computer and the like or graphics recorded on a recording medium, such as an optical disc or a magnetic tape, onto a special screen, wall surface, or floor surface. In the prior art, when using a projector, the projector, more specifically, the case of the display device, must be spaced by a few meters from the projection surface (e.g., screen or wall). Thus, an object that blocks the projection light cannot be placed in between the display device and the projection surface. To resolve this problem, techniques for shortening the distance between the case of a projector and a projection surface is being developed. For example, a projector that is now being developed shortens the projection distance by using an aspheric reflection mirror, which enables wide-angle projection (refer to Japanese Laid-Open Patent Publication No. 2004-252049).

A projector that shortens the projection distance will now be discussed with reference to FIG. 9. The projector includes a case 101 and an aspheric reflection mirror 102. When the projector is in use, the aspheric reflection mirror 102 is projected out of a surface 101a of the case 101. When not in use, the aspheric reflection mirror 102 is retracted into the case 101.

SUMMARY OF THE INVENTION

The case 101 of the projector has a setting surface 103. Normally, the setting surface 103 is set on a horizontal surface 104, such as a floor surface or a desk, so that the projector emits projection light diagonally upward (refer to the arrows formed from single-dashed lines) toward a vertical surface, such as a wall surface or a screen.

Referring to FIG. 10, a user may wish to project graphics onto the horizontal surface 104 in a state in which the projector is set on the horizontal surface 104, which may be a floor surface or a desk. In such a state, the setting surface 103 would be orthogonal to the horizontal surface 104, and a portion of the outer surface of the case 101 that differs from the setting surface 103 would be set adjacent to or in abutment with the horizontal surface 104.

In this specification, the state of use as shown in FIG. 10 is referred to as a floor set-floor projection mode, and the state of use as shown in FIG. 9 is referred to as a floor set-wall projection mode.

When in the floor set-floor projection mode, the projector emits projection light from the aspheric reflection mirror 102 in a diagonally downward direction. Therefore, in this state, relatively heavy optical system units, such as the aspheric reflection mirror 102, would be located at an upper portion of the case 101. Since the heavy aspheric reflection mirror 102 is located at the upper portion of the case 101 and projected out of the surface 101a toward the projection direction, the center of gravity of the projector would be biased toward the upper portion of the case 101 and in the projection direction. In such a state, the projector is unstable and is apt to tip over in the projection direction (refer to arrow R).

The present invention provides a projector including an aspheric reflection mirror that does not tip over in the floor set-floor projection mode.

One aspect of the present invention is a projector including a wide-angle projection aspheric reflection mirror. A case accommodates the aspheric reflection mirror. A bulged portion is formed on the case. When the display device is set so that the aspheric reflection mirror is located at an upper portion of the case, at least a lower portion of the case forming the bulged portion bulges in a projection direction into a non-projection area located immediately below the aspheric reflection mirror.

A further aspect of the present invention is a projector for emitting projection light in a projection direction used in at least a floor set-wall projection mode and a floor set-floor projection mode. The projector includes a wide-angle projection aspheric reflection mirror which reflects light from a light source in the projection direction. A case accommodates the aspheric reflection mirror. The aspheric reflection mirror reflects the projection light to emit the projection light through an opening in the case. The case includes a first setting surface, which is arranged adjacent to a floor when in the floor set-wall projection mode, and a second setting surface, which is arranged adjacent to the floor when in the floor set-floor projection mode. The second setting surface in the floor set-floor projection mode is located immediately below the aspheric reflection mirror and bulges in the projection direction to a location that is in alignment with or frontward from a front end of the aspheric reflection mirror.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3(a) is a plan view showing a projector of a reference example in use in the floor set-floor projection mode;

FIG. 3(b) is a side view showing the device of FIG. 3(a) from opposite a first setting surface;

FIG. 3(c) is a side view showing the device of FIG. 3(a);

FIG. 3(d) is a perspective view showing the device of FIG. 3(a) in use in the floor set-floor projection mode;

FIG. 4 is a diagram illustrating the tipping of the projector shown in FIG. 3 when in use in the floor set-floor projection mode;

DETAILED DESCRIPTION OF THE PREFERRED EMBODIMENTS

Figure 1:
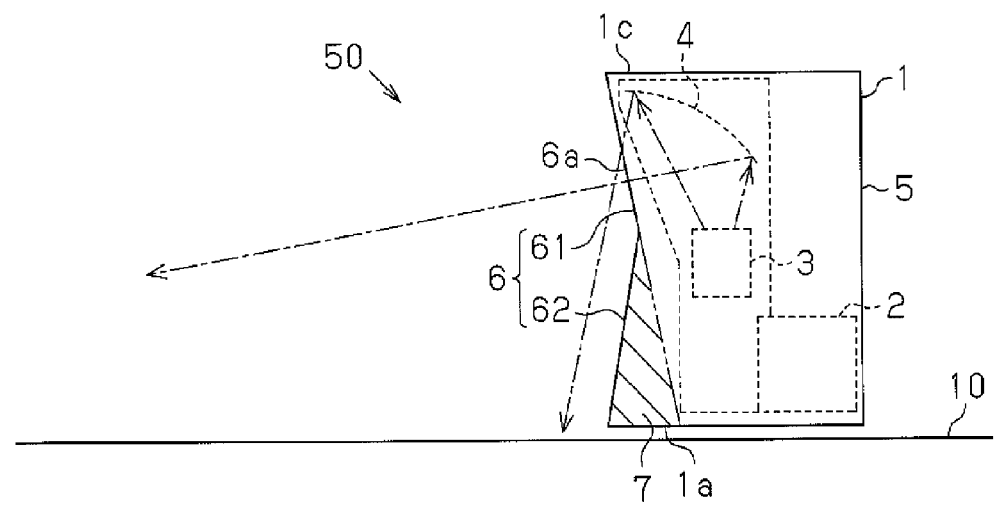
FIG. 1 is a side view showing a projector according to a first embodiment of the present invention in use in the floor set-floor projection mode.

A projector 50 according to a first embodiment of the present invention will now be discussed with reference to the drawings. The projector 50 is a liquid crystal display (LCD) projector including an LCD panel, which serves as an optical modulation element. As shown in FIG. 1, the projector 50 includes a case 1, which accommodates a light source 2, a projection lens system component 3, an aspheric reflection mirror 4, and control circuit components (not shown). Light, which is generated by the light source 2, strikes the aspheric reflection mirror 4 via the projection lens system component 3. The light reflected by the aspheric reflection mirror 4 is emitted as projection light from an opening 6a in a mirror side outer surface 6 of the case 1.

FIGS. 3(a), 3(b), 3(c), and 3(d) show a reference example of a projector, which minimizes unnecessary space in the case 1. As shown in FIG. 3(c), in the projector of the reference example, the light source 2 is arranged in the case 1 near an outer surface 5 of the case 1. The projection lens system component 3 and the aspheric reflection mirror 4 are arranged in the case 1 near an outer surface 6 of the case 1. The outer surface 6 is also referred to as the mirror side outer surface, and the outer surface 5 is also referred to as the mirror-opposing side outer surface.

Figure 9:
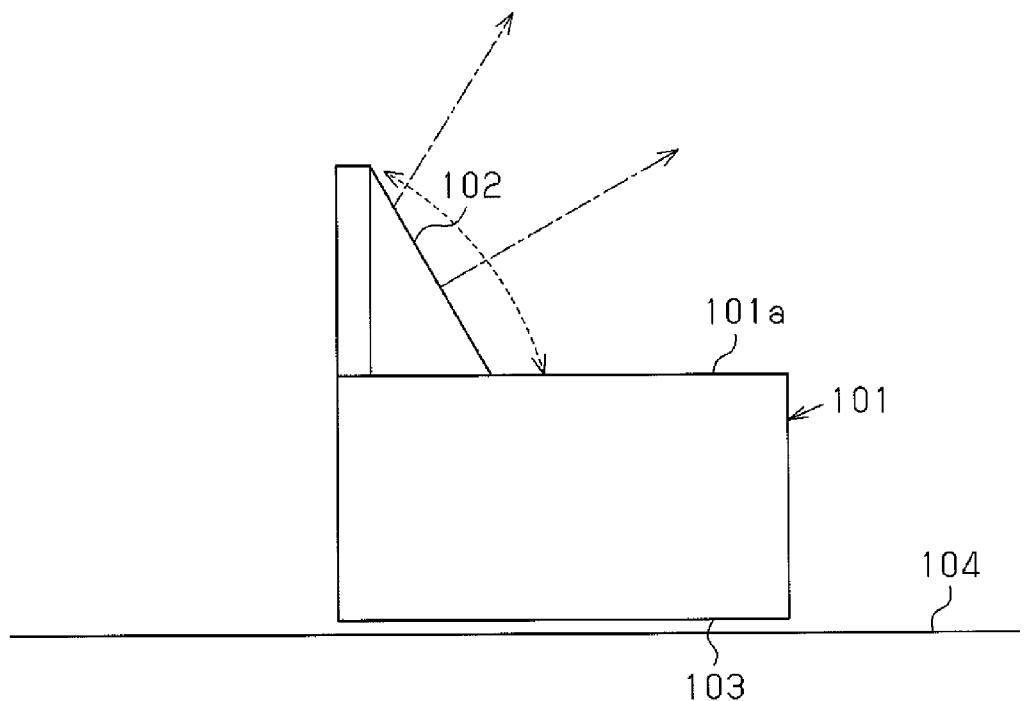
FIG. 9 is a side view showing a projector of the prior art in use in the floor set-wall projection mode.
Figure 10:
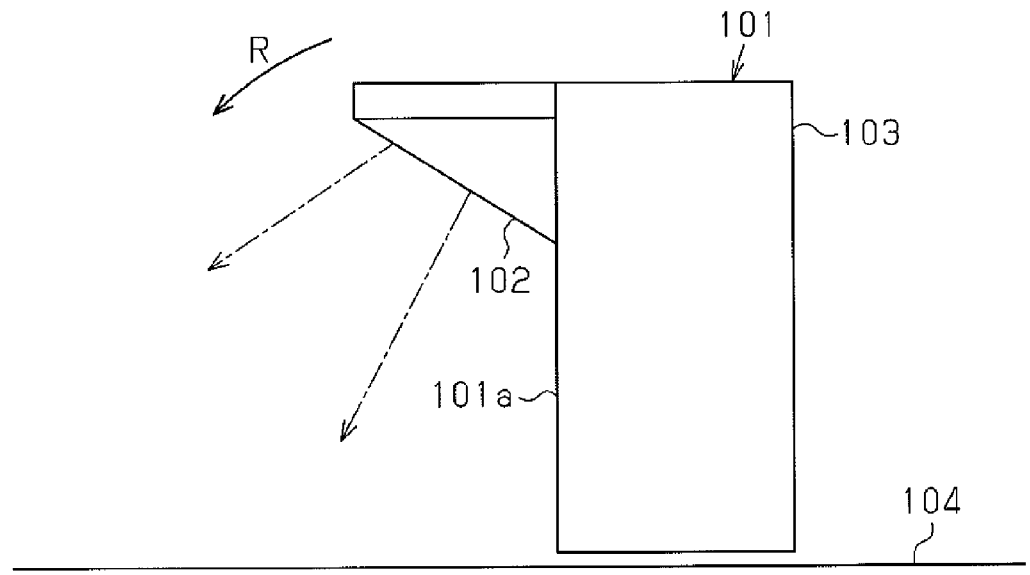
FIG. 10 is a side view showing the projector of FIG. 9 in use in the floor set-floor projection mode.

When in the floor set-wall projection mode as shown in the state of FIG. 3(c), the display device of the reference example is arranged on the horizontal surface 10 such that the mirror-opposing side outer surface 5 functions as the bottom surface. To minimize unnecessary space in the case 1, the mirror side outer surface 6 is inclined toward an outer surface 1a. In the reference example of FIG. 3 and the prior art example of FIGS. 9 and 10, the cases have different shapes. However, the display devices of the reference example and the prior art example generally have the same weight balance.

Referring to FIG. 3(d), in the floor set-floor projection mode, the projector of the reference example is arranged so that the upper portion of the mirror side outer surface 6 bulges more in the projection direction than the lower part of the mirror side outer surface 6. This enables the aspheric reflection mirror 4, which would be located at the upper portion of the case 1 in this state, to project graphics onto a horizontal surface 10, such as a floor surface. However, since the center of gravity of the projector is biased in the projection direction at the upper portion of the case 1, the projector is apt to tip over in the projection direction (refer to arrow R).

Figure 2:
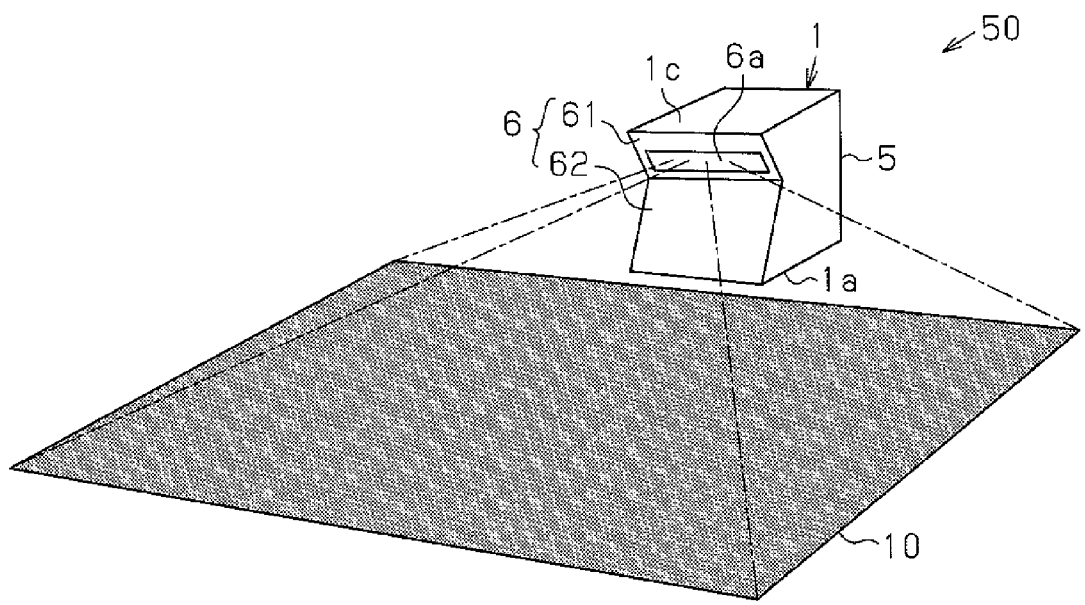
FIG. 2 is a perspective view showing the projector of FIG. 1 in use in the floor set-floor projection mode.

Therefore, in the first embodiment, the projector employs a structure that reduces or prevents the tipping of the projector in floor set-floor projection mode. For example, in a state in which the projector 50 is used in the floor set-floor projection mode as shown in FIGS. 1 and 2, a non-projection area 7 (hatched portion in FIG. 1), in which there is no interference with projection light, is formed immediately under the aspheric reflection mirror 4. The case 1 is formed so as to occupy the non-projection area 7. In one example, when viewed in a state in which the projector 50 is in the floor set-floor projection mode, the mirror side outer surface 6 of the case 1 includes a first outer surface 61, which includes the opening 6a, and a second outer surface 62, which is located below the opening 6a. In the same manner as the reference example of FIG. 3, the first outer surface 61 is an inclined surface that bulges more in the projection direction at upper portions. The second outer surface 62 is an inclined surface that bulges more in the projection direction at lower portions within an area in which it does not interfere with the projection light from the aspheric reflection mirror 4. The first outer surface 61 and the second outer surface 62 may be inclined so that they are, for example, V-shaped and generally symmetric to each other with respect to a boundary in between.

The outer surface 1a of the case 1 functions as a setting surface, or bottom surface, in the floor set-floor projection mode. It is preferred that the outer surface 1a has a front end located immediately below the aspheric reflection mirror 4 either in alignment with the front end of the aspheric reflection mirror 4 or frontward from the front end of the aspheric reflection mirror 4. In the first embodiment, in the floor set-floor projection mode, the second outer surface 62 and the outer surface 1a function as a bulged portion that bulges in the projection direction into the non-projection area 7, which is located immediately below the aspheric reflection mirror 4.

Figure 5:
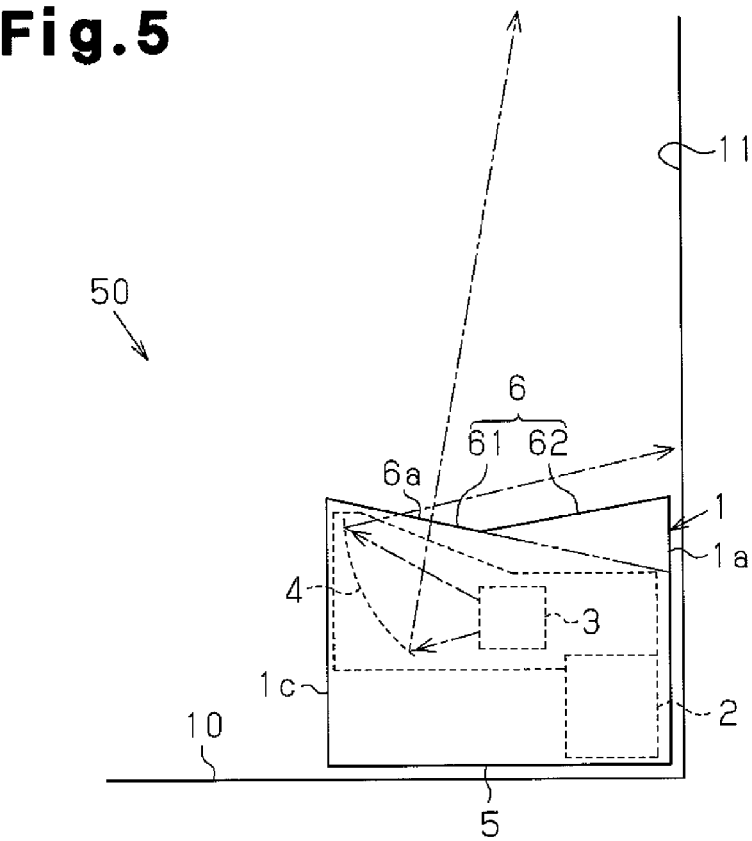
FIG. 5 is a side view showing the projector in use in the floor set-wall projection mode.

When not in the floor set-floor projection mode, the projector 50 of FIG. 1 is used in the same manner as in the prior art. For example, the projector 50 may be used in the floor set-wall projection mode as shown in FIG. 5. In the floor set-wall projection mode, the projector 50 is set on the horizontal surface 10, which may be a floor surface or a desk, to project graphics onto a vertical surface 11, such as a upstanding wall surface or a screen. For example, the projector 50 may be held upside down from the state shown in FIG. 1 and be attached to a ceiling (ceiling suspension-wall projection mode). Further, the projector 50 may be fixed to the vertical surface 11, which may be a wall surface or a partition, so that the mirror-opposing side surface 5 shown in FIG. 1 is about against the vertical surface. This allows the projector to project graphics onto the vertical surface 11.

The projector 50 of the first embodiment has the advantages described below.

(1) When the projector 50 is used in the floor set-floor projection mode, at least part of the case 1 bulges into the non-projection area 7, which is located immediately below the aspheric reflection mirror 4. Thus, the projector 50 does not tip over in the floor set-floor projection mode.

(2) When the projector 50 is used in the floor set-floor projection mode, the non-projection area 7 below the aspheric reflection mirror 4 is entirely occupied by part of the case 1. The setting surface 1a of the case 1 bulges in the projection direction. This enlarges the setting surface 1a. Thus, the projector 50 does not tip over in the projection direction.

(3) The aspheric reflection mirror 4 is accommodated and fixed at a light emitting position in the case 1. In one embodiment, the aspheric reflection mirror 4 is entirely accommodated in the case 1. This improves the outer appearance of the projector 50.

(4) Unlike the prior art, the aspheric reflection mirror 4 does not have to be projected and retracted whenever it is used. This increases the convenience for using the projector 50.

(5) The first outer surface 61 and second outer surface 62, which form the mirror side outer surface 6, are inclined so that they are generally symmetric to each other with respect to a boundary in between and form, for example, a V-shaped inclination surface. Thus, when the projector 50 is used in the floor set-floor projection mode, the second outer surface 62 bulges more outward toward the projection side at lower portions. This increases the effect for preventing the projector 50 from tipping. Further, the generally V-shaped mirror side outer surface 6 of the case 1 provides a novel design for the outer appearance of the case 1.

Figure 6:
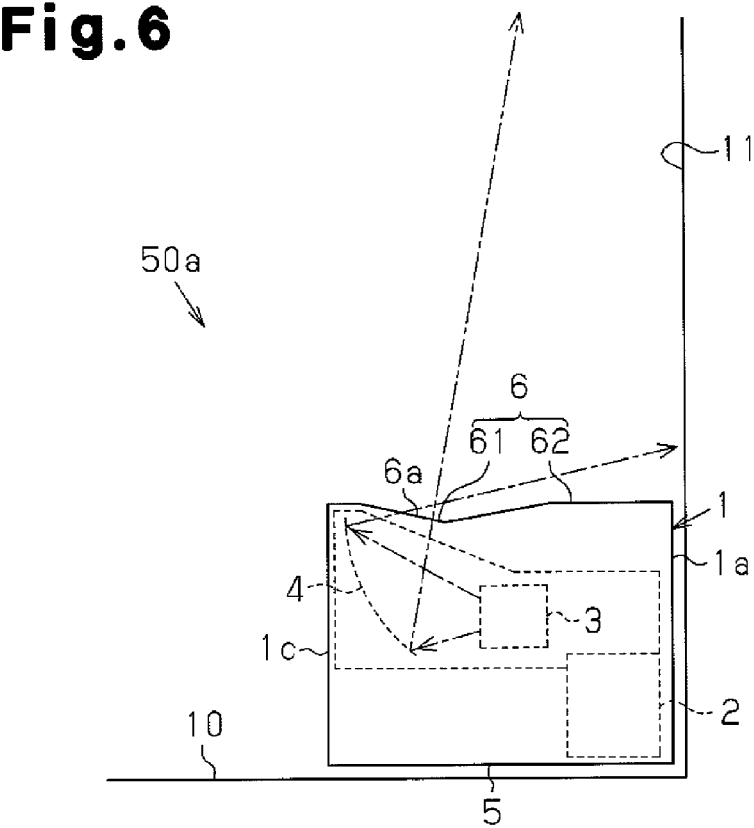
FIG. 6 is a side view showing a projector according to a second embodiment of the present invention in use in the floor set-wall projection mode.

With reference to FIG. 6, a projector 50a according to a second embodiment of the present invention will now be discussed. In the second embodiment, the shape of the first outer surface 61 of the mirror side outer surface 6 is changed from that of the first embodiment. In the second embodiment, only the portion of the mirror side outer surface 6 near the boundary of the first outer surface 61 and the second outer surface 62 form symmetric inclined surfaces. The other portions of the mirror side outer surface 6 are leveled surfaces that are not inclined. Therefore, the case 1 is generally a rectangular parallelepiped and box-shaped. In the second embodiment, the second outer surface 62 and the outer surface 1a function as a bulging portion bulging in the projection direction into the non-projection area 7 immediately below the aspheric reflection mirror 4.

In the projector 50a of the second embodiment, the lower portion (bottom surface 1a) of the case 1 when used in the floor set-floor projection mode bulges more forward in the projection direction than in the prior art. This prevents tipping of the case 1. Further, the case 1 is box-shaped and more of a rectangular parallelepiped. This forms an outer appearance having stability.

Figure 7:
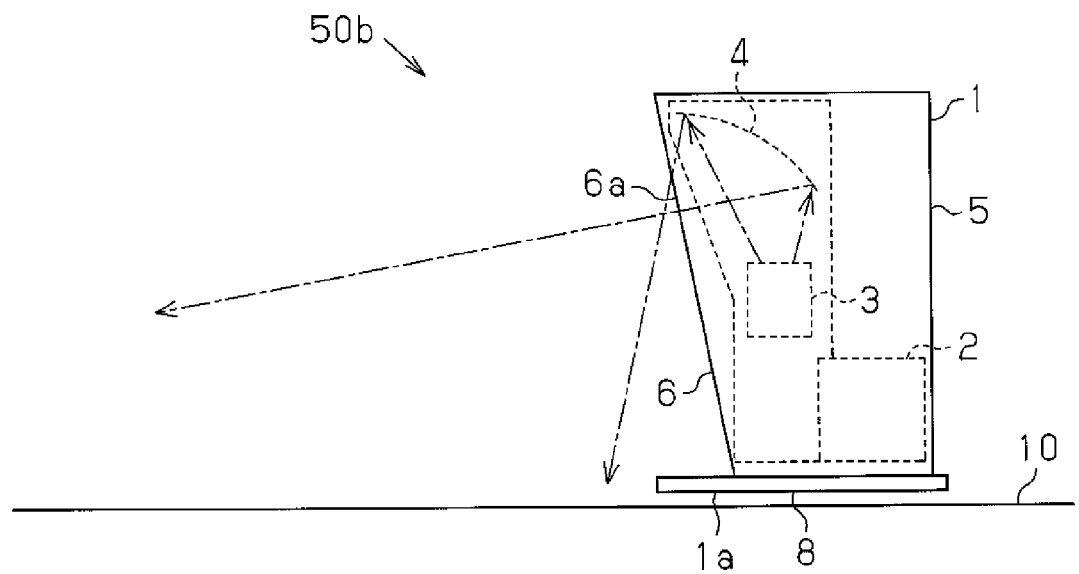
FIG. 7 is a side view showing a projector according to a third embodiment of the present invention in use in the floor set-floor projection mode.
Figure 8:
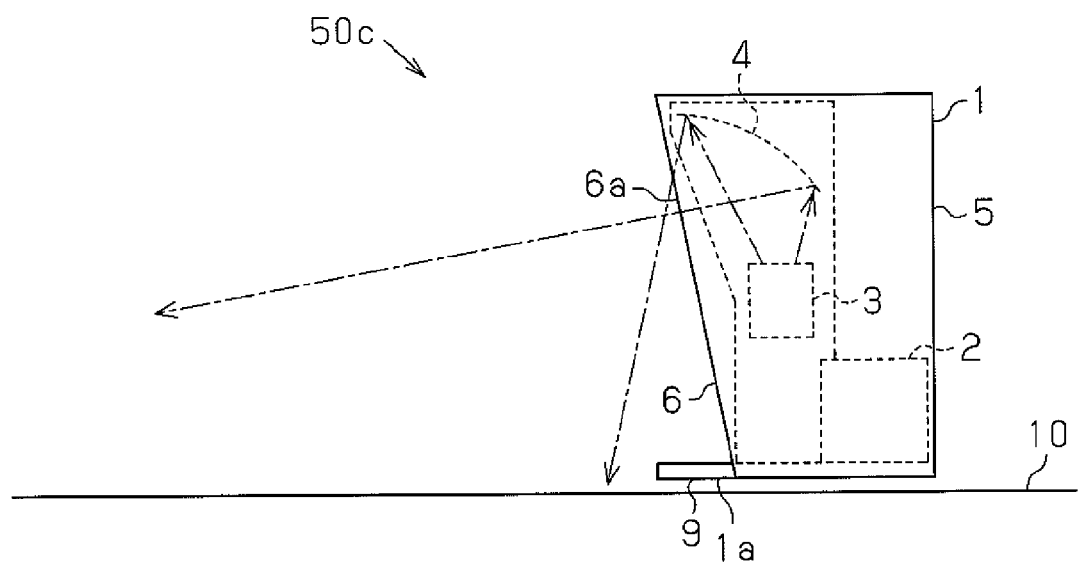
FIG. 8 is a side view showing a projector according to a fourth embodiment of the present invention in use in the floor set-floor projection mode.

With reference to FIG. 7, a projector 50b according to a third embodiment of the present invention will now be discussed. The projector 50b includes a plate 8, which bulges outward toward a location immediately below the aspheric reflection mirror 4 when used in the floor set-floor projection mode. Further, the plate 8, which is attached to the case 1 in a removable manner, functions as the bottom surface 1a in this state.

In the third embodiment, when using the projector 50b in the floor set-floor projection mode, the plate 8, which is attached to the lower surface of the case 1 so as to bulge outward at a position immediately below the aspheric reflection mirror 4, prevents the projector 50b from tipping without increasing volume at the lower part of the case 1. This decreases the weight of the case 1 and reduces costs.

In the third embodiment, the plate 8 functions as a bulging portion bulging in the projection direction into the non-projection area 7 immediately below the aspheric reflection mirror 4.

With reference to FIG. 7, a projector 50c according to a fourth embodiment of the present invention will now be discussed. The projector 50c includes a plate 9, which bulges outward toward a location immediately below the aspheric reflection mirror 4 when used in the floor set-floor projection mode. The plate 9, which is part of the case 1, is formed integrally with the case 1 and function as the bottom surface 1a. The fourth embodiment has the same advantages as the third embodiment.

In the fourth embodiment, the plate 9 functions as a bulging portion bulging in the projection direction into the non-projection area 7 immediately below the aspheric reflection mirror 4.

It should be apparent to those skilled in the art that the present invention may be embodied in many other specific forms without departing from the spirit or scope of the invention. Particularly, it should be understood that the present invention may be embodied in the following forms.

(1) In each of the above embodiments, the aspheric reflection mirror 4 is accommodated in the case 1 in a fixed state. However, the aspheric reflection mirror 4 may be of a movable type and be projected from the case for use in the same manner as in the prior art example shown in FIG. 9. In such a case, when projecting the aspheric reflection mirror in the floor set-floor projection mode, at least the lower part of the case 1 should be bulged in the projection direction into the non-projection area 7 below the aspheric reflection mirror in the same manner as in the first, third, and fourth embodiments.

(2) In the fourth embodiment, the plate 9 is fixed and formed integrally with the case. However, the plate 9 may be retractable into the case 1. For example, the plate 9 may be attached to the case 1 in a foldable manner or an extendible manner. Such a plate 9 would not be an obstacle when used in a mode other than the floor set-floor projection mode.

(3) The projector in each of the above embodiments is an LCD projector that includes an LCD panel functioning as a light modulation element. However, other types of projectors including an image light generation system may also be used as the projector. For example, the present invention may be applied to a projector that performs Digital Light Processing (DLP), registered trademark of Texas Instruments Incorporated.

The present examples and embodiments are to be considered as illustrative and not restrictive, and the invention is not to be limited to the details given herein, but may be modified within the scope and equivalence of the appended claims.

What is claimed is:

1. A projector comprising:
a wide-angle projection aspheric reflection mirror;
a case that accommodates the aspheric reflection mirror and includes a bulged exterior surface and a bottom surface adjacent to a floor when the projector is set in a floor set-floor projection mode in which the aspheric reflection mirror is located at an upper portion of the case to downwardly emit the projection light towards the floor and the bulged exterior surface is located at a lower portion of the case,
wherein when the projector is set in the floor set-floor projection mode, a portion of the case forming the bulged exterior surface bulges in a projection direction into a non-projection area while the bottom surface of the case occupies a floor area that is located immediately below the entire aspheric reflection mirror, said floor area being defined by a projection of said mirror on the floor.

2. The projector according to claim 1, wherein:
the aspheric reflection mirror is accommodated and fixed at a light emitting position in the case.

3. The projector according to claim 2, wherein:
the aspheric reflection mirror is arranged adjacent to a mirror side outer surface of the case; and
the mirror side outer surface includes
a first outer surface, which is located at a higher position during use, and
a second outer surface, which is located at a lower position during use,
wherein the first surface and the second surface are symmetric with respect to a boundary therebetween to form a V-shaped inclined surface.

4. The projector according to claim 3, wherein the first outer surface and the second outer surface entirely form the mirror side outer surface.

5. The projector according to claim 3, wherein the case is a box-shaped rectangular parallelepiped and has a surface including the V-shaped inclined surface, in which the first surface and the second surface form part of the mirror outer surface, and the second outer surface is inclined only near the boundary.

6. The projector according to claim 1, wherein the case includes a lower plate formed integrally with the case or a lower plate attached in a removable manner to the case.

7. The projector according to claim 1, wherein the bottom surface of the case occupies the floor area that is located immediately below the entire aspheric reflection mirror including front and rear ends of the aspheric reflection minor.

8. The projector according to claim 1, wherein, said floor area is defined by a complement of the set of all points that are not below the minor.

9. The projector according to claim 1, wherein, said floor area is defined by the set of all points that are inside the set of points directly underneath a periphery of the mirror.

10. A projector for emitting projection light in a projection direction used in at least a floor set-wall projection mode and a floor set-floor projection mode, the projector comprising:
    a wide-angle projection aspheric reflection mirror that reflects light from a light source in the projection direction; and
    a case that accommodates the aspheric reflection mirror;
    wherein the aspheric reflection minor reflects the projection light to emit the projection light through an opening in the case;
    wherein the case includes
        a first setting surface, which is arranged adjacent to a floor when in the floor set-wall projection mode, and that upwardly emits the projection light
        a second setting surface, which is arranged adjacent to the floor when in the floor set-floor projection mode that downwardly emits the projection light towards the floor; and
    wherein the second setting surface in the floor set-floor projection mode occupies a floor area that is located immediately below the entire aspheric reflection minor, said floor area being defined by a projection of said minor the floor, and
    wherein the second setting surface bulges in the projection direction to a location at or beyond a projection of the front end of the aspheric reflection minor on the floor when the projector is in the floor set-floor projection mode.

11. The projector according to claim 10, wherein the bottom surface of the case occupies the floor area that is located immediately below the entire aspheric reflection mirror including front and rear ends of the aspheric reflection mirror.

12. The projector according to claim 10, wherein, said floor area is defined by a complement of the set of all points that are not below the mirror.

13. The projector according to claim 10, wherein, said floor area is defined by the set of all points that are inside the set of points directly underneath a periphery of the mirror.

* * * * *